United States Patent
Hosford et al.

(10) Patent No.: US 6,681,904 B1
(45) Date of Patent: Jan. 27, 2004

(54) GOLF CART ANTI-THEFT DEVICE

(76) Inventors: Robert Hosford, 7010 Bendelow Dr., Lakeland, FL (US) 33810; Inez Hosford, 7010 Bendelow Dr., Lakeland, FL (US) 33810

( * ) Notice: Subject to any disclaimer, the term of this patent is extended or adjusted under 35 U.S.C. 154(b) by 117 days.

(21) Appl. No.: 10/093,277

(22) Filed: Mar. 6, 2002

(51) Int. Cl.$^7$ .................. B60R 25/08; B60K 41/26; F16D 69/00
(52) U.S. Cl. .................. 188/265; 188/67; 307/10.3; 70/202; 192/220.4
(58) Field of Search ............... 188/19, 69, 265; 70/198, 199, 200, 202, 237; 307/10.2, 10.3; 192/219.6, 220.4–220.7; 180/287, 288, 289

(56) References Cited

U.S. PATENT DOCUMENTS

| | | | |
|---|---|---|---|
| 4,301,901 A | * 11/1981 | Jensen | 192/220.4 |
| 5,001,913 A | * 3/1991 | Gamboni | 70/202 |
| 5,460,021 A | * 10/1995 | Taylor | 70/209 |
| 5,835,868 A | * 11/1998 | McElroy et al. | 701/2 |
| 5,842,364 A | * 12/1998 | Oliver | 70/202 |
| 6,390,222 B1 | * 5/2002 | Cornelius | 180/287 |
| 6,592,495 B2 | * 7/2003 | Jeon | 477/197 |

* cited by examiner

*Primary Examiner*—Christopher P. Schwartz
(74) *Attorney, Agent, or Firm*—Michael I. Kroll

(57) ABSTRACT

A golf cart anti-theft device for locking the brake pedal in the depressed position includes a solenoid member with an extrudable shaft and wedge that is wired into the keyed vehicle on-off switch electrical circuit. When the key is on, the solenoid is activated and the shaft remains in the withdrawn position. When the key is in the off position the solenoid is deactivated and the shaft extrudes to force the wedge against the vehicle break arm solenoid bearing member, brake pedal arm and the vehicle floorboard bottom surface, preventing the brake pedal arm from moving from the depressed position. The device can be retrofitted to existing carts or installed in the original manufacture, and can eliminate the need for a parking brake. The device can also be adapted for an above floorboard installation.

40 Claims, 8 Drawing Sheets

GOLF CART ANTI-THEFT DEVICE

BACKGROUND OF THE INVENTION

1. Field of the Invention

The present invention relates generally to motorized vehicle anti-theft device and more specifically to a brake-lock mechanism.

2. Description of the Prior Art

There are numerous anti-theft devices that lock the steering wheel or brake pedal or short-circuit the ignition system. None of these devices would be practical for an open vehicle such as a golf cart. Also it would be difficult to retrofit such devices to existing golf carts.

SUMMARY OF THE PRESENT INVENTION

The present invention is a golf cart anti-theft device that can be manufactured with new carts or retrofitted to existing golf carts. The anti-theft device is a brake-lock that is initiated when the vehicle's on-off key is turned to the off position. This action is taken after the parking brake has been set, leaving the brake pedal in the depressed position. The movement of the key to the off position de-energizes a solenoid that, in turn, causes a brake arm engaging element to extrude and bear upon the brake arm solenoid bearing member. This forces the brake pedal to remain in the depressed position. The solenoid brake engaging element remains in a brake engaging position until the ignition key is moved to the on position, thereby energizing the solenoid and retracting the brake engaging element.

A primary object of the present invention is to provide an anti-theft device for golf carts.

Another object of the present invention is to provide an anti-theft system having a solenoid that can be retrofitted to a golf cart.

Still yet another object of the present invention is to provide an anti-theft system having a solenoid with an alternately extrudable and retractable brake pedal engaging element, the solenoid responding to movement of a key.

Still yet another object of the present invention is to provide an anti-theft system having a key that can be movably positioned to a locked or unlocked position.

Another object of the present invention is to provide an anti-theft system having a key that will cause a brake pedal engaging element to selectively move between an engaged and disengaged position.

Additional objects of the present invention will appear as the description proceeds.

The anti-theft device uses a key positionable to a locked (off) or unlocked (on) position that energizes a solenoid that extends or retracts a brake pedal engaging element. The solenoid when de-energized advances a brake pedal engaging element that forces the engagement element against the brake arm solenoid bearing member to hold the pedal in a depressed and engaged position. The solenoid brake engaging element remains in a brake pedal engaging position until the key is placed in an on position thereby energizing the solenoid which retracts the brake pedal engaging element.

In one embodiment, a brake lock apparatus is provided for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the apparatus comprising: a solenoid member, the solenoid member having an extrudable member, the extrudable member being extruded when the solenoid is deactivated, the extrudable member being withdrawn when the solenoid is activated, the solenoid member being positioned forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

In another embodiment, the extrudable member bears directly upon the brake arm solenoid bearing member.

In another embodiment, the floorboard has a bottom surface and the solenoid is positioned beneath the floorboard such that the extrudable arm, when extruded, simultaneously bears upon the floorboard bottom surface and the brake arm solenoid bearing member.

In another embodiment, the floorboard has a bottom surface and the solenoid is positioned beneath the floorboard and the extrudable arm has a wedge member, the wedge member bearing upon the floorboard bottom surface and the brake arm solenoid bearing member when the extrudable member is in the extruded position.

In another embodiment, the floorboard has a bottom surface and the solenoid member is attached to the floorboard bottom surface.

In one embodiment, a brake lock apparatus is provided for attachment to a vehicle, the vehicle having a keyed on-off switch for starting the vehicle, and a floorboard, the vehicle also having a vehicle brake system, the vehicle brake system having a brake pedal, a brake arm solenoid bearing member, and a brake pedal arm, the brake pedal arm extending through the floorboard, the vehicle being braked when the brake pedal is depressed, the apparatus comprising: brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

A brake lock apparatus is provided for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the apparatus comprising: break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member when the extrudable member is in the extruded position.

In one embodiment, a brake lock apparatus is provided for attachment to a vehicle, the vehicle having a keyed on-off switch for starting the vehicle, and a floorboard, the vehicle also having a vehicle brake system, the vehicle brake system having a brake pedal, and the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising: a break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member, when the extrudable member is in the extruded position.

In another embodiment, the floorboard has a bottom surface and the solenoid member is attached to the floorboard bottom surface.

In one embodiment a brake lock apparatus is provided for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising: brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

A brake lock apparatus is provided for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising: a break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member, when the extrudable member is in the extruded position.

In one embodiment, there is provided, in combination with a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising: a break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member when the extrudable member is in the extruded position.

In another embodiment, the floorboard has a bottom surface and the solenoid member is attached to the floorboard bottom surface.

In one embodiment, there is provided, in combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising: brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

In one embodiment, there is provided, in combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising: a break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member when the extrudable member is in the extruded position.

In one embodiment there is provided, in combination with a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising: a break arm solenoid bearing member, a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member when the extrudable member is in the extruded position.

In another embodiment, the floorboard has a bottom surface and the solenoid member is attached to the floorboard bottom surface.

In one embodiment there is provided, in combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising: brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

In one embodiment there is provided, in combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising: a break arm solenoid bearing member, solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

In another embodiment, the extrudable member bears directly upon the break arm solenoid bearing member.

In another embodiment, the floorboard has a bottom surface and the extrudable arm, when extruded, simultaneously bears upon the floorboard bottom surface and the break arm solenoid bearing member.

In another embodiment, the floorboard has a bottom surface and the extrudable arm has a wedge member, the wedge member bearing upon the floorboard bottom surface and the break arm solenoid bearing member when the extrudable member is in the extruded position.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

Figure 3:
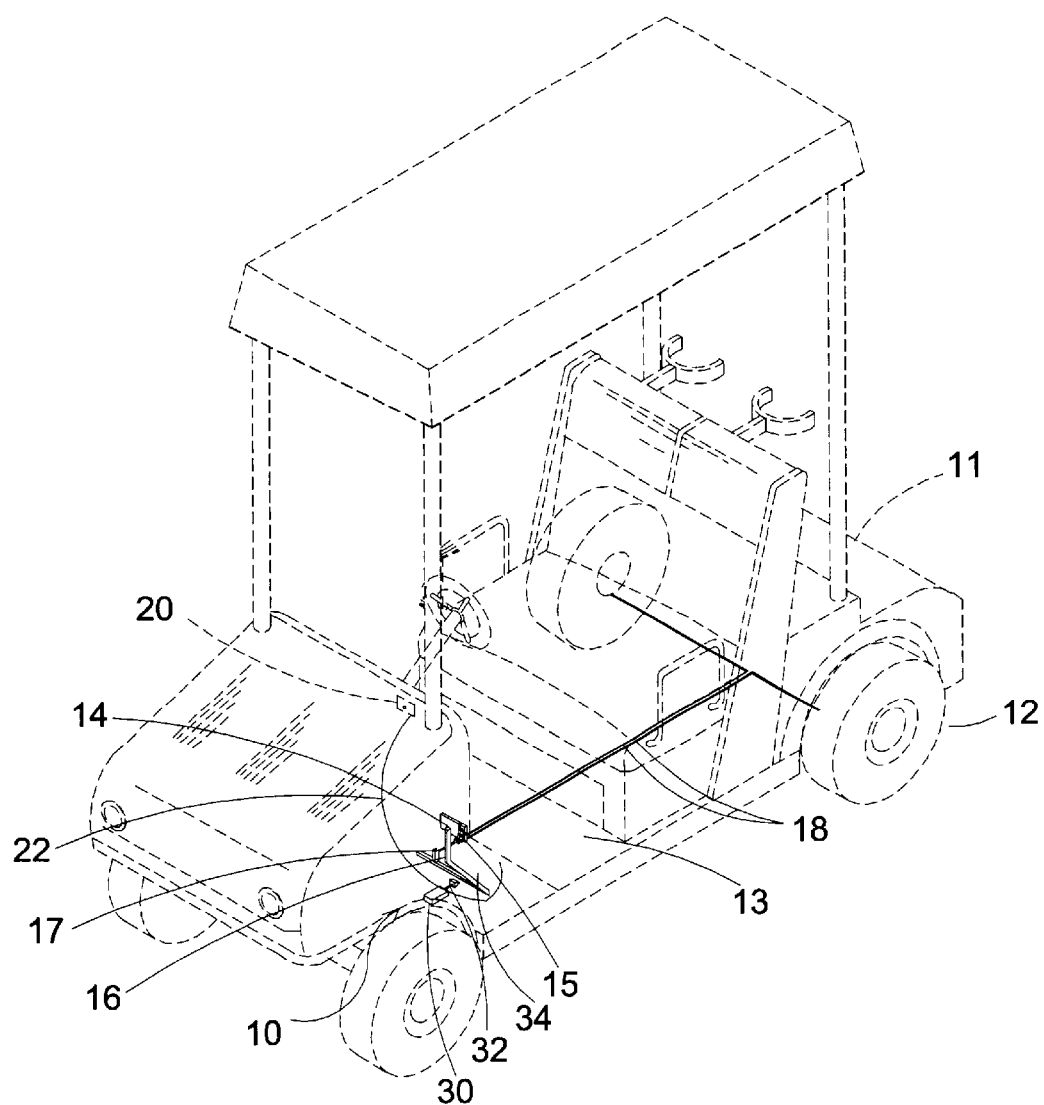

FIG. 3 shows that when the key is in the off position, a solenoid is de-energized and a brake pedal engaging member extends to a position that, once the parking brake has been engaged by depressing, holds the brake pedal in the depressed position. The brake pedal engaging element will remain in an engaged position until the key is placed in the on position to energize the solenoid thereby releasing the brake pedal engaging element.

Figure 4:
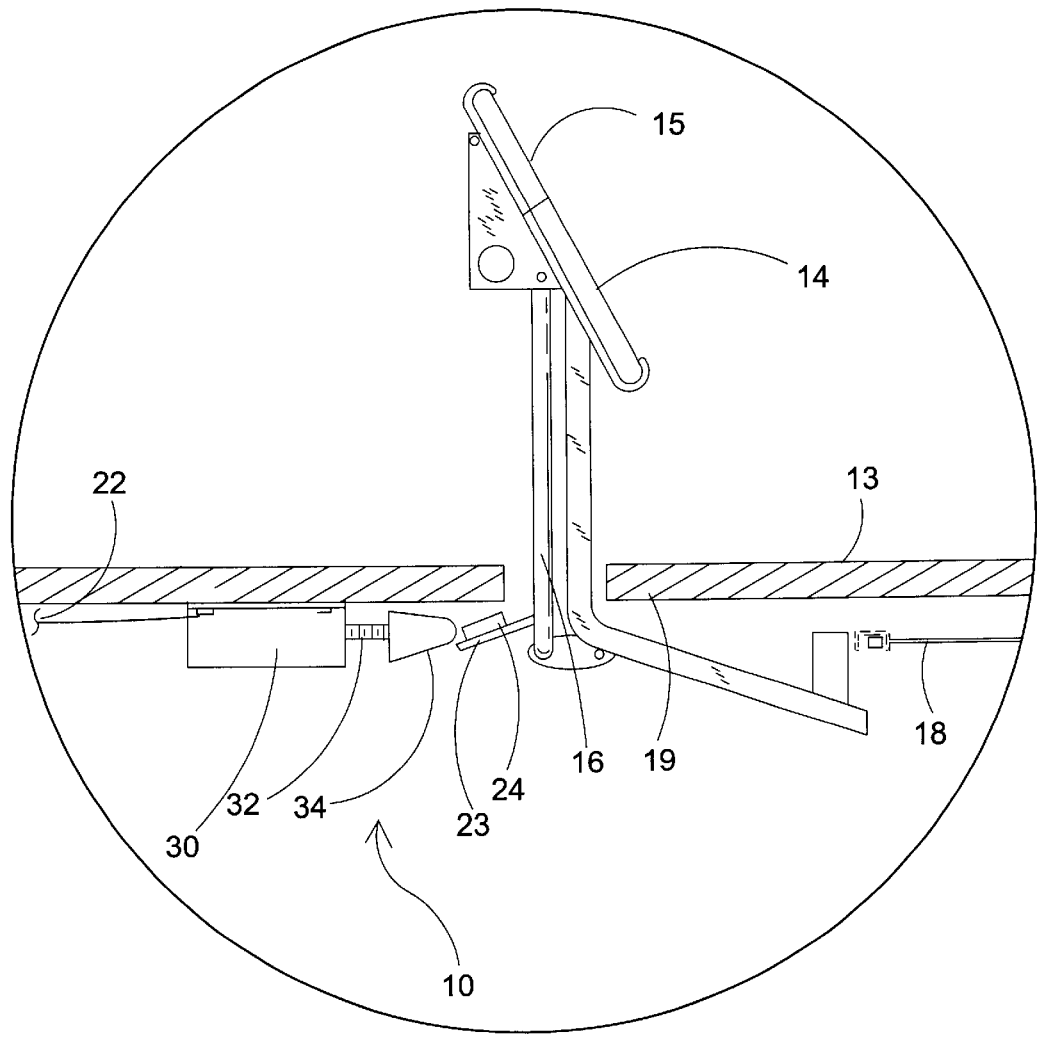

FIG. 4 shows a partial view of the brake mechanism of a golf cart having a brake pedal and a brake arm with a brake pedal attached thereto. The present invention is a break arm solenoid bearing member a solenoid device with a shaft and a brake pedal arm-engaging element. The solenoid device is connected to the existing golf cart electrical system whereby turning the vehicle on-off switch to the off position will cause the incorporated solenoid device to move the brake pedal arm engaging element into contact with the break arm solenoid bearing member which will cause the brake to be engaged and remain engaged until the vehicle on-off switch key is moved to the on position, thus retracting the brake arm engaging element.

Figure 5:
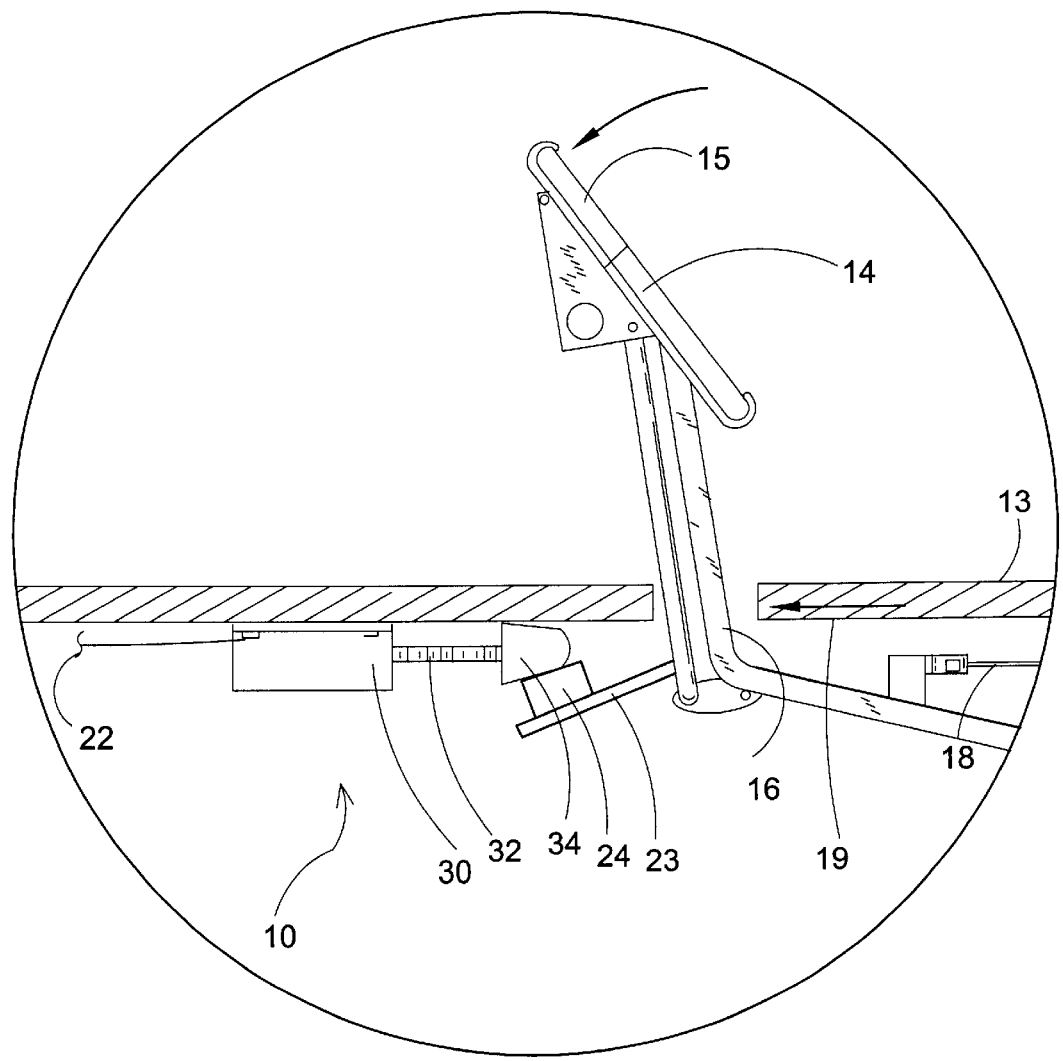

FIG. 5 shows the pedal is depressed and locked mechanically by the operator. The parking brake is an integral part of the brake pedal. The parking brake is typically released when the operator depresses the accelerator pedal. When the brake pedal is locked in the park position and the key is turned off, the solenoid is deactivated and the wedge on the brake pedal arm engaging member is thrust forward against the break arm solenoid bearing member and the floorboard so as to prevent the brake pedal from moving from the depressed position.

Figure 6:
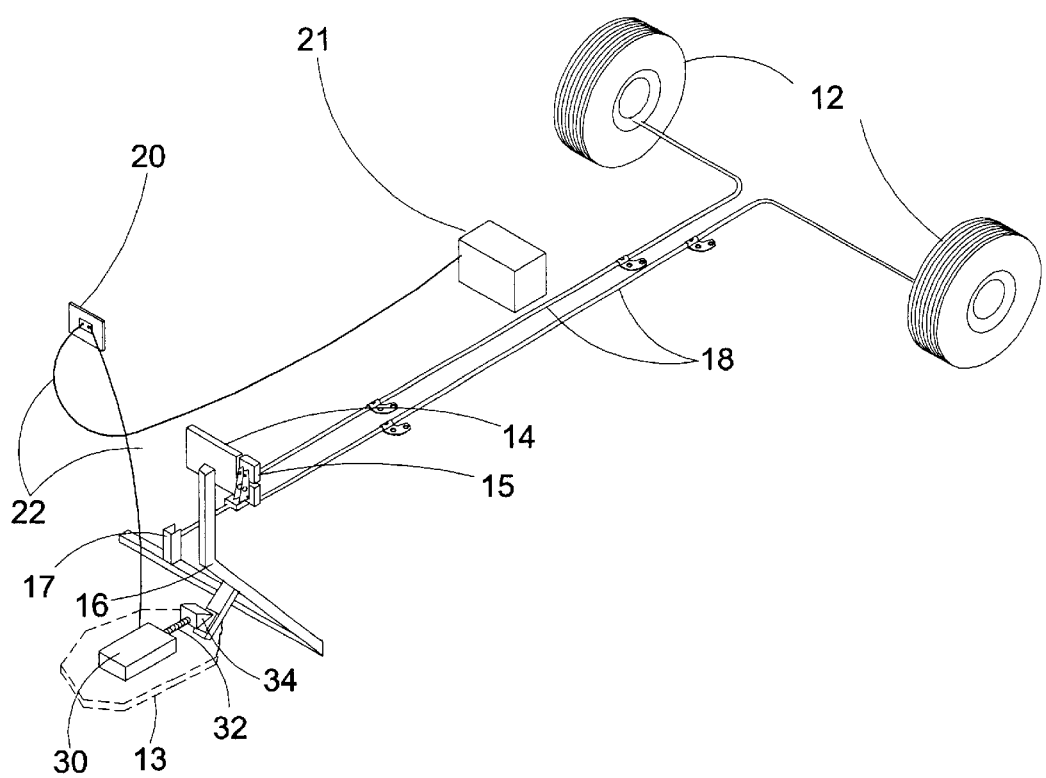

FIG. 6 is an isolated oblique view of the vehicle brake system components and the brake lock device of the present invention.

Figure 7:
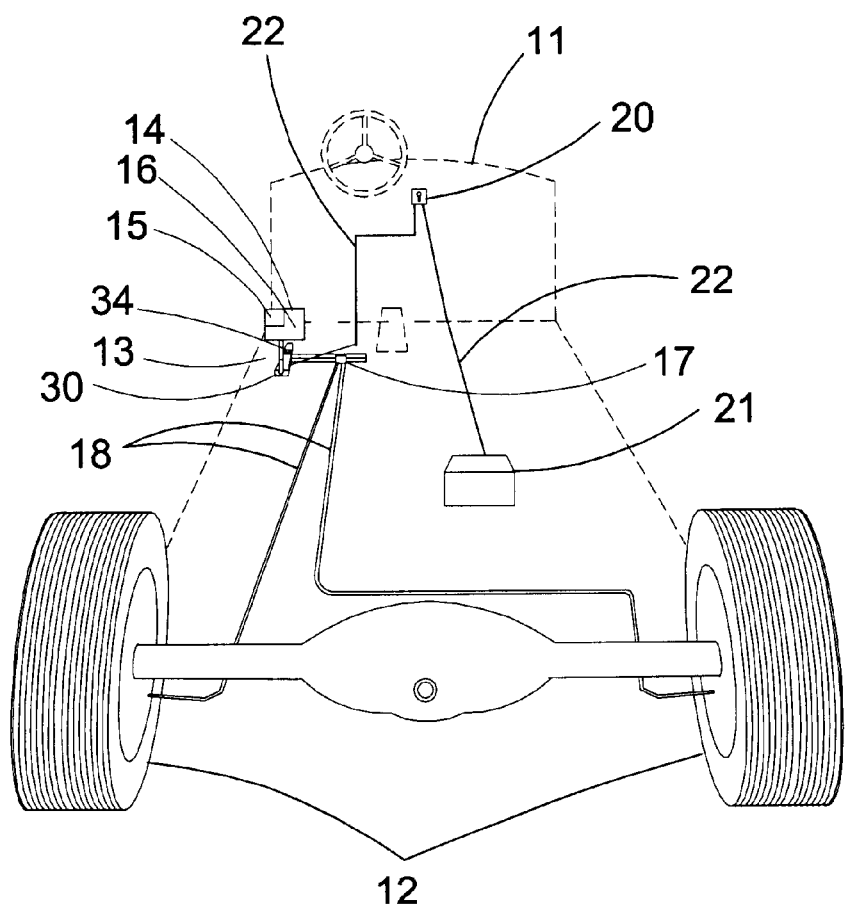
Figure 8:
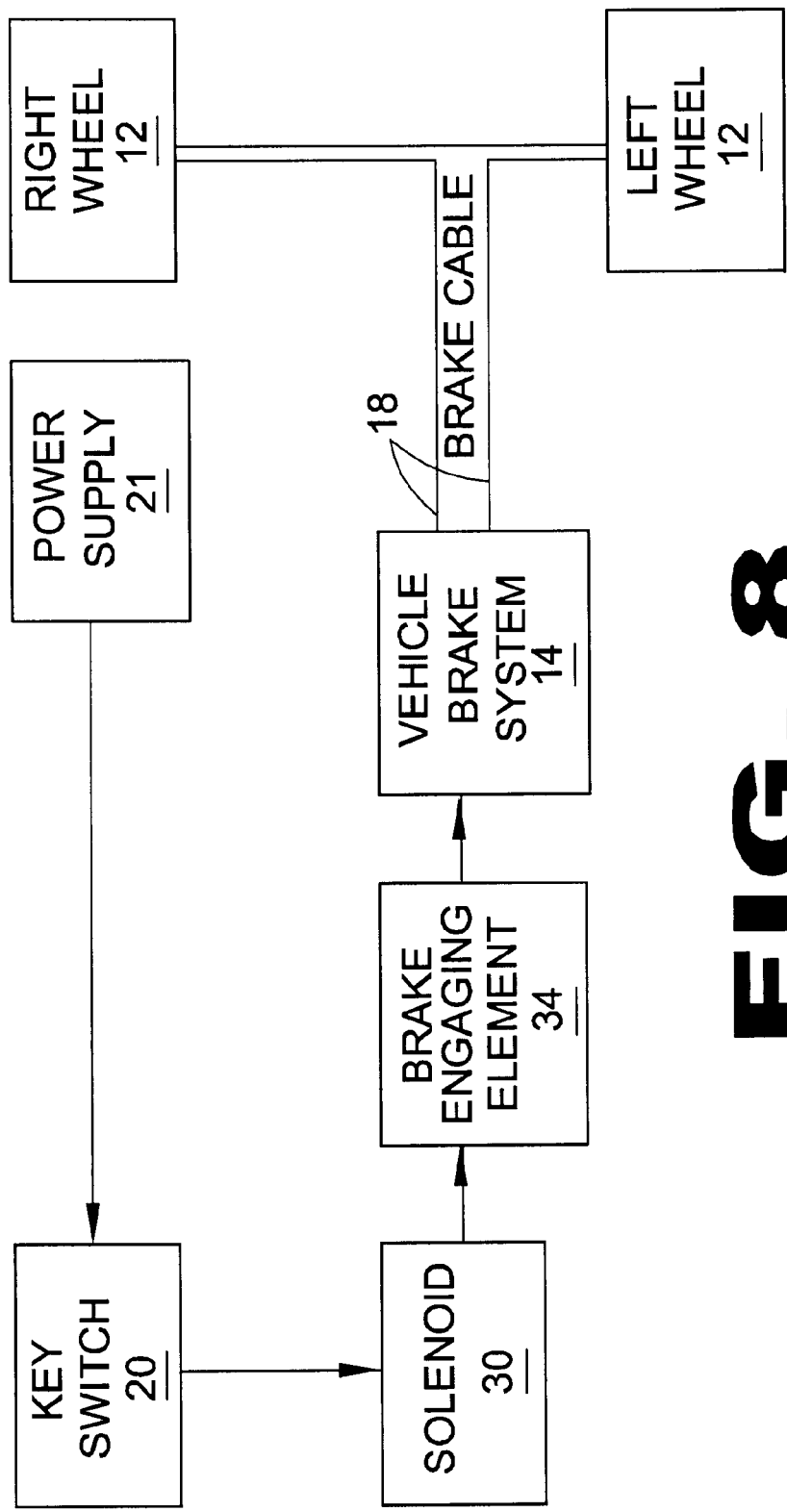

FIG. 7 is an isolated rear view of the vehicle brake system components and the brake lock device of the present invention FIG. 8 is a block diagram of the vehicle brake system with the present brake lock device incorporated.

DESCRIPTION OF THE REFERENCED NUMERALS

Turning now descriptively to the drawings, in which similar reference characters denote similar elements throughout the several views, the figures illustrate the Golf Cart Anti-Theft Device of the present invention. With regard to the reference numerals used, the following numbering is used throughout the various drawing figures.

10 Golf Cart Anti-Theft Device of the present invention
11 golf cart
12 golf cart rear wheels
13 golf cart floorboard
14 brake pedal
15 parking brake mechanism
16 brake pedal arm
17 brake pedal to brake cable linkage
18 brake cables
19 floorboard bottom surface
20 keyed on-off switch
21 vehicle battery
22 electrical circuit assembly wires
23 brake pedal solenoid bearing member
24 bearing member bumper
30 solenoid member
32 solenoid extruding shaft
34 solenoid shaft wedge

DETAILED DESCRIPTION OF THE PREFERRED EMBODIMENT

The following discussion describes in detail the preferred embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
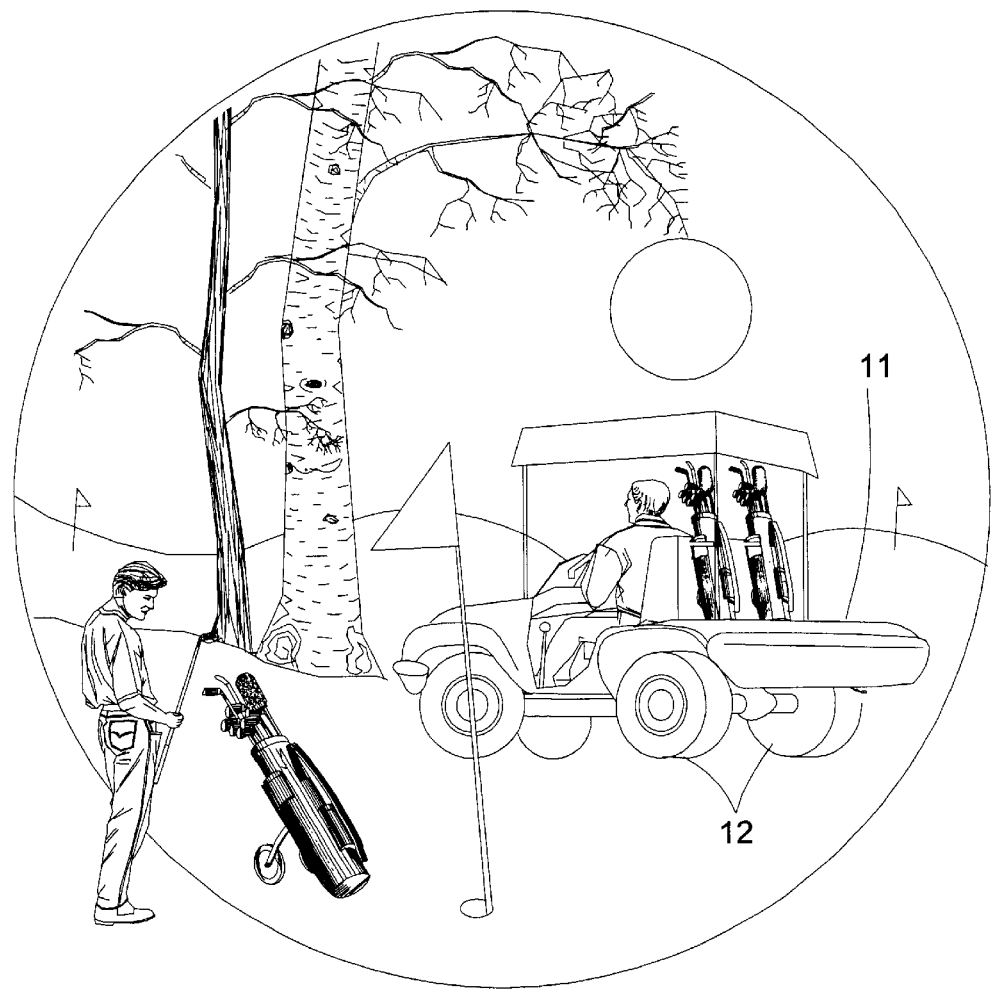
FIG. 1 shows a typical use of a golf cart that can be manufactured with or retrofitted to prevent unauthorized movement of the golf cart.
Figure 2:
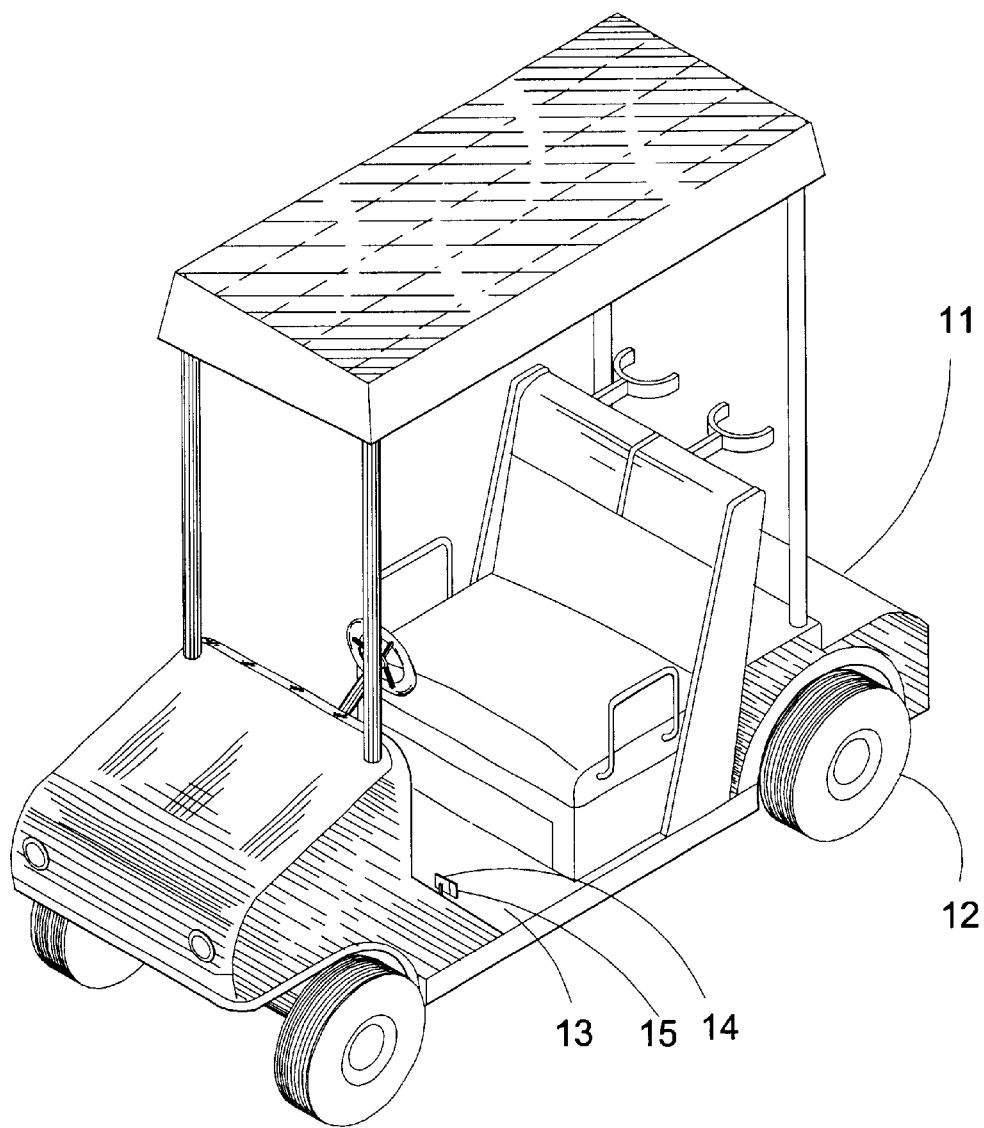
FIG. 2 depicts a typical golf cart that can be manufactured with or retrofitted to prevent unauthorized movement of the golf cart.

FIGS. 1–8 depict various embodiments of the Golf Cart Anti-Theft Device 10 of the present invention. Typical golf carts 11 that can be built or retrofitted with the device 10 are shown in FIGS. 1–2. The typical golf cart 10 has a vehicle brake system for preventing rotation of at least the rear wheels 12. The operator's feet are positioned on the cart floorboard 13 until braking action is desired at which time the brake pedal 14 is depressed, and a parking brake system is usually provided and is operated using the parking brake 15 assembly.

When the brake pedal 14 is depressed a brake pedal arm 16 works through linkage 17 to pull brake cables 18 that manipulate typical brake mechanisms in the rear wheels 12.

Also present on the typical golf cart 11 is a keyed on-off switch 20 that allows the cart 11 to be operated generally when in the on position. A battery 21 and conventional wiring 22 forms the basic operating circuit. FIG. 3 and FIG. 6 show representative wiring 22 for incorporating the present invention into the cart 11. When the cart 11 is stored the switch 20 will be off and the cart motor cannot be used. However, the parking brake 15 system can be mechanically released and provides no anti-theft function in and of itself.

The present invention provides a break arm solenoid bearing member 23 solenoid member 30 with an extrusion member in the form of a shaft 32 and a wedge 34 attached to the shaft 32. The solenoid member 30 is attached to the floorboard bottom surface 19 in front of, and in line with, the brake pedal arm 16, as shown in FIGS. 3–7.

The solenoid member 30 is connected to the keyed on-off switch 20 by wiring 22 shown representatively in FIG. 3 and FIG. 6. When the on-off switch 20 is in the on position the solenoid 30 is electrically activated and the shaft 32 is withdrawn into the solenoid member 30, as shown in FIG. 4. When the on-off switch 20 is in the off position the solenoid 30 is deactivated and the shaft 32 extrudes, forcing the wedge 34 against the depressed break arm solenoid bearing member 23 preventing the brake pedal arm 16 from moving, as shown in FIG. 5.

At the end of a golf game the typical user will depress the brake pedal 14 and set the parking brake mechanism 15. This leaves the brake pedal arm 16 in a depressed position with the brake pedal to brake cable linkage 17 pulling the brake cables 18 such that the rear wheel 12 brake shoes, or other conventional brake assemblies prevent the rear wheel 12 from turning.

With the brake pedal arm 16 in the depressed position the user then turns the keyed on-off switch 20 to the off position. This action deactivates the solenoid 30 causing the extrusion of the shaft 32 and the attached wedge 24. As shown in FIG. 5, the wedge 24 is forced against the break arm solenoid bearing member 23 of the brake pedal arm 16 and also against the floorboard bottom surface 19, in the preferred embodiment. In this position the wedge 34 prevents the brake arm pedal 16 from moving from the depressed position, regardless if the parking brake mechanism 15 is mechanically released by a potential thief.

In another embodiment, the present invention replaces the parking brake mechanism. In this embodiment the user stops the cart 11 in the storage location and holds the brake pedal in a depressed position while the on-off key switch is moved to the off position. The extruding shaft and wedge then encounter the break arm solenoid bearing member of the brake pedal arm and prevent it from leaving the depressed position.

In another embodiment, the solenoid member is attached above the floorboard.

With respect to the above description then, it is to be realized that the optimum material and dimensional relationships for the parts of the anti-theft device 10, will include variations in size, materials, shape, and form, which will occur to those skilled in the art upon review of the present disclosure. For example the solenoid 30 enclosure, shaft 32 and wedge 34 can be constructed from various metals and plastics. The shaft 32 can be configured to encounter the brake arm pedal 16 without a wedge 34 and without the involvement of the floorboard surface 19. All equivalent relationships to those illustrated in the drawings and described in the specification are intended to be encompassed by the present invention.

What is claimed as new and desired to be protected by Letters Patent is set forth in the appended claims:

1. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the apparatus comprising:

a solenoid member, the solenoid member having an extrudable member, the extrudable member being extruded when the solenoid is deactivated, the extrudable member being withdrawn when the solenoid is activated, the solenoid member being positioned forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

2. The apparatus of claim 1, wherein the extrudable member bears directly upon the brake pedal arm.

3. The apparatus of claim 1, wherein the floorboard has a bottom surface and the solenoid is positioned beneath the floorboard such that the extrudable arm, when extruded, simultaneously bears upon the floorboard bottom surface and the break arm solenoid bearing member of the brake pedal arm.

4. The apparatus of claim 1, wherein the floorboard has a bottom surface and the solenoid is positioned beneath the floorboard and the extrudable arm has a wedge member, the wedge member bearing upon the floorboard bottom surface and the break arm solenoid bearing member of the brake pedal arm when the extrudable member is in the extruded position.

5. The apparatus of claim 1, wherein the floorboard has a bottom surface and the solenoid member is attached to the floorboard bottom surface.

6. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the apparatus comprising:

brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

7. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

8. The apparatus of claim 7, wherein the extrudable member bears directly upon the break arm solenoid bearing member of the brake pedal arm.

9. The apparatus of claim 7, wherein the floorboard has a bottom surface and the extrudable arm, when extruded, simultaneously bears upon the floorboard bottom surface and the break arm solenoid bearing member of the brake pedal arm.

10. The apparatus of claim 7, wherein the floorboard has a bottom surface and the extrudable arm has a wedge member, the wedge member bearing upon the floorboard bottom surface and the break solenoid bearing member of the brake pedal arm when the extrudable member is in the extruded position.

11. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

12. The apparatus of claim 11, wherein the extrudable member bears directly upon the break arm solenoid bearing member of the brake pedal arm.

13. The apparatus of claim 11, wherein the floorboard has a bottom surface and the extrudable arm, when extruded, simultaneously bears upon the floorboard bottom surface and the break arm solenoid bearing member of the brake pedal arm.

14. The apparatus of claim 11, wherein the floorboard has a bottom surface and the extrudable arm has a wedge member, the wedge member bearing upon the floorboard bottom surface and the break arm solenoid bearing member of the brake pedal arm when the extrudable member is in the extruded position.

15. The apparatus of claim 11, wherein the floorboard has a bottom surface and the solenoid member is attached to the floorboard bottom surface.

16. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising:

brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

17. A brake lock apparatus for attachment to a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, the apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

18. The apparatus of claim 17, wherein the extrudable member bears directly upon the break arm solenoid bearing member of the brake pedal arm.

19. The apparatus of claim 17, wherein the floorboard has a bottom surface and the extrudable arm, when extruded, simultaneously bears upon the floorboard bottom surface and the break arm solenoid bearing member of the brake pedal arm.

20. The apparatus of claim 17, wherein the floorboard has a bottom surface and the extrudable arm has a wedge member, the wedge member bearing upon the floorboard bottom surface and the break arm solenoid bearing member of the brake pedal arm when the extrudable member is in the extruded position.

21. In combination with a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

22. The apparatus of claim 21, wherein the extrudable member bears directly upon the break arm solenoid bearing member of the brake pedal arm.

23. The apparatus of claim 21, wherein floorboard has a bottom surface and the extrudable arm, when extruded, simultaneously bears upon the floorboard bottom surface and the break arm solenoid bearing member of the brake pedal arm.

24. The apparatus of claim 21, wherein the floorboard has a bottom surface and the extrudable arm has a wedge member, the wedge member bearing upon the floorboard bottom surface and the break arm solenoid bearing member of the brake pedal arm when the extrudable member is in the extruded position.

25. The apparatus of claim 21, wherein the floorboard has a bottom surface and the solenoid member is attached to the floorboard bottom surface.

26. In combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising:

brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

27. In combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, a brake lock apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

28. The apparatus of claim 27, wherein the extrudable member bears directly upon the break arm solenoid bearing member of the brake pedal arm.

29. The apparatus of claim 27, wherein the floorboard has a bottom surface and the extrudable arm, when extruded, simultaneously bears upon the floorboard bottom surface and the break arm solenoid bearing member of the brake pedal arm.

30. The apparatus of claim 27, wherein the floorboard has a bottom surface and the extrudable arm has a wedge member, the wedge member bearing upon the floorboard bottom surface and the break arm solenoid bearing member of the brake pedal arm when the extrudable member is in the extruded position.

31. In combination with a vehicle, the vehicle having a keyed on-off switch for starting the vehicle, and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and an electrical circuit assembly that connects at least the solenoid member and the keyed on-off switch, for manipulating the solenoid in response to the key position, the solenoid member being activated when the key is moved to the on position, the solenoid being deactivated when the key is moved to the off position.

32. The apparatus of claim 31, wherein the extrudable member bears directly upon the break arm solenoid bearing member of the brake pedal arm.

33. The apparatus of claim 31, wherein the floorboard has a bottom surface and the extrudable arm, when extruded, simultaneously bears upon the floorboard bottom surface and the break arm solenoid bearing member of the brake pedal arm.

34. The apparatus of claim 31, wherein the floorboard has a bottom surface and the extrudable arm has a wedge member, the wedge member bearing upon the floorboard bottom surface and the break arm solenoid bearing member of the brake pedal arm when the extrudable member is in the extruded position.

35. The apparatus of claim 31, wherein the floorboard has a bottom surface and the solenoid member is attached to the floorboard bottom surface.

36. In combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising:

brake pedal movement prevention means for preventing the brake pedal from moving from the depressed position when said means is initiated; and an electrical circuit assembly that connects at least the brake pedal movement prevention means and the keyed on-off switch, for initiating the brake pedal movement prevention means in response to the key position, the brake pedal movement prevention means being initiated when the key is moved to the off position, the brake pedal movement prevention means initiation being terminated when the key is moved to the on position.

37. In combination with a vehicle, the vehicle having a keyed on-off switch and a floorboard, the vehicle also having a vehicle brake system, the vehicle brake system having a brake pedal, and a brake pedal arm, the brake pedal arm extending through the floorboard, the vehicle being braked when the brake pedal is depressed, the vehicle brake system further having a parking brake system wherein the brake pedal is fixed in a depressed position when the parking brake system is initiated, a brake lock apparatus comprising:

a solenoid member, the solenoid member having an extrudable member, the extrudable member being extruded when the solenoid is deactivated, the extrudable member being withdrawn when the solenoid is activated, the solenoid member being positioned beneath the floorboard and forward of the brake pedal arm such that when the brake pedal arm is depressed and the solenoid is deactivated, the extrudable arm prevents the brake pedal arm from moving from the depressed position; and means for activating and deactivating the solenoid member in response to the movement of the key in the on-off switch.

38. The apparatus of claim 37, wherein the extrudable member bears directly upon the break arm solenoid bearing member of the brake pedal arm.

39. The apparatus of claim 37, wherein the floorboard has a bottom surface and the extrudable arm, when extruded, simultaneously bears upon the floorboard bottom surface and the break arm solenoid bearing member of the brake pedal arm.

40. The apparatus of claim 37, wherein the floorboard has a bottom surface and the extrudable arm has a wedge member, the wedge member bearing upon the floorboard bottom surface and the break arm solenoid bearing member of the brake pedal arm when the extrudable member is in the extruded position.

* * * * *